(12) United States Patent
Keshtkarjahromi et al.

(10) Patent No.: US 11,308,041 B2
(45) Date of Patent: Apr. 19, 2022

(54) DISTRIBUTED SECURE EDGE STORAGE NETWORK UTILIZING REDUNDANT HETEROGENEOUS STORAGE

(71) Applicant: Seagate Technology LLC, Cupertino, CA (US)

(72) Inventors: Yasaman Keshtkarjahromi, Shakopee, MN (US); Mehmet Fatih Erden, St. Louis Park, MN (US)

(73) Assignee: Seagate Technology LLC, Fremont, CA (US)

( * ) Notice: Subject to any disclaimer, the term of this patent is extended or adjusted under 35 U.S.C. 154(b) by 203 days.

(21) Appl. No.: 16/669,712

(22) Filed: Oct. 31, 2019

(65) Prior Publication Data
US 2021/0133152 A1 May 6, 2021

(51) Int. Cl.
*G06F 16/182* (2019.01)
*G06F 16/903* (2019.01)

(52) U.S. Cl.
CPC ...... *G06F 16/182* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 8,132,073 B1* | 3/2012 | Bowers | H04L 9/3271 714/755 |
| 9,015,853 B2 | 4/2015 | Stefanov et al. | |
| 9,961,142 B2 | 5/2018 | Li et al. | |
| 10,965,448 B1* | 3/2021 | Raman | G06F 9/5061 |
| 2017/0048021 A1* | 2/2017 | Yanovsky | H04L 63/1458 |
| 2019/0036648 A1 | 1/2019 | Yanovsky et al. | |
| 2019/0361988 A1* | 11/2019 | Petters | G06F 16/182 |
| 2020/0153627 A1* | 5/2020 | Wentz | H04L 9/3218 |

FOREIGN PATENT DOCUMENTS

WO  WO 2013191658 A1  12/2013

* cited by examiner

*Primary Examiner* — Uyen T Le
(74) *Attorney, Agent, or Firm* — Mueting Raasch Group (57) ABSTRACT

N storage nodes that are coupled via a network are selected to store a file of size $|F|$ and redundancy of size $|F_{red}|$. A value Z<N is selected such that an attacker having access to Z storage nodes is unable to decode any partial information of the file. The file is divided into d partitions of size $|P_{s_N}|$, wherein $|P_{s_N}|$ is a maximum factor of $|F|$ subject to $|P_{s_N}| \leq |s_N|$. Independent linear combinations $h_i$'s of the d partitions are created and random keys are generated and stored in the first Z of the N storage nodes. Independent linear combinations $g_i$'s of the random keys are created and combinations of the $h_i$'s and $g_i$'s are stored in the Z+1 to $N^{th}$ storage nodes.

20 Claims, 9 Drawing Sheets

$$V = \begin{bmatrix} 1 & 1 & 1 & 1 & 1 \\ 1 & 2 & 4 & 8 & 3 \\ 1 & 3 & 9 & 1 & 3 \\ 1 & 4 & 3 & 12 & 9 \\ 1 & 5 & 12 & 8 & 1 \\ 1 & 6 & 10 & 8 & 9 \\ 1 & 7 & 10 & 5 & 9 \\ 1 & 8 & 12 & 5 & 1 \end{bmatrix} \Rightarrow \begin{bmatrix} h_1 \\ h_2 \\ h_3 \\ h_4 \\ h_5 \\ h_6 \\ h_7 \\ h_8 \\ h_9 \\ h_{10} \\ h_{11} \\ h_{12} \\ h_{13} \end{bmatrix} = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 1 & 1 & 1 & 1 \\ 1 & 2 & 4 & 8 & 3 \\ 1 & 3 & 9 & 1 & 3 \\ 1 & 4 & 3 & 12 & 9 \\ 1 & 5 & 12 & 8 & 1 \\ 1 & 6 & 10 & 8 & 9 \\ 1 & 7 & 10 & 5 & 9 \\ 1 & 8 & 12 & 5 & 1 \end{bmatrix} \begin{bmatrix} f_1 \\ f_2 \\ f_3 \\ f_4 \\ f_5 \end{bmatrix} = \begin{bmatrix} f_1 \\ f_2 \\ f_3 \\ f_4 \\ f_5 \\ f_1 + f_2 + f_3 + f_4 + f_5 \\ f_1 + 2f_2 + 4f_3 + 8f_4 + 3f_5 \\ f_1 + 3f_2 + 9f_3 + f_4 + 3f_5 \\ f_1 + 4f_2 + 3f_3 + 12f_4 + 9f_5 \\ f_1 + 5f_2 + 12f_3 + 8f_4 + f_5 \\ f_1 + 6f_2 + 10f_3 + 8f_4 + 9f_5 \\ f_1 + 7f_2 + 10f_3 + 5f_4 + 9f_5 \\ f_1 + 8f_2 + 12f_3 + 5f_4 + f_5 \end{bmatrix}$$

DISTRIBUTED SECURE EDGE STORAGE NETWORK UTILIZING REDUNDANT HETEROGENEOUS STORAGE

SUMMARY

The present disclosure is directed to a distributed edge secure storage network utilizing redundant heterogeneous storage. In one embodiment, N storage nodes that are coupled via a network are selected to store a file of size $|F|$ and redundancy of size $|F_{red}|$. At least two of the N storage nodes allocate different sizes of memory for storing the file. The N storage nodes are ordered from a largest storage capacity at the first storage node to a smallest capacity $|s_N|$ at the $N^{th}$ storage node. A value Z<N is selected such that an attacker having access to Z storage nodes is unable to decode any partial information about the file. The file is divided into d partitions of size $|P_{s_N}|$, wherein $|P_{s_N}|$ is a maximum factor of $|F|$ subject to $|P_{s_N}| \leq |s_N|$. Independent linear combinations $h_i$'s of the d partitions are created and random keys are generated and stored in the first Z of the N storage nodes. Independent linear combinations $g_i$'s of the random keys are created and combinations of the $h_i$'s and $g_i$'s are stored in the $(Z+1)^{st}$ to $N^{th}$ storage nodes.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to distributed data storage systems. Due to, among other things, the widespread adoption of mobile devices and the "Internet of things" (IoT), data is being generated exponentially. It is estimated by one source that data creation will grow to an enormous 163 zettabytes by 2025, which is ten times the amount of data created in 2017. This stored data can include large amounts of automatically generated data, e.g., data generated by sensors. The sensor data may include the raw data captured by end devices as well as the data generated as the result of analyzing the raw data. One solution for storing and analyzing large amounts of data involves transferring it to large data centers, which is commonly referred to as cloud storage.

Assuming network traffic grows exponentially, it may become increasingly difficult to send all of the created data to cloud for storage, especially for time-critical applications. In some emerging technologies, such as smart cities and autonomous cars, the data may need to be analyzed and stored in real-time, which may be difficult to do in the cloud. Among other things, cloud computing may be affected by relatively high latency (e.g., the cloud storage facility may be located a long distance from where the data is generated) as well as due to unpredictability of network connections (e.g., due to spikes in demands, outages, etc.).

Figure 1:
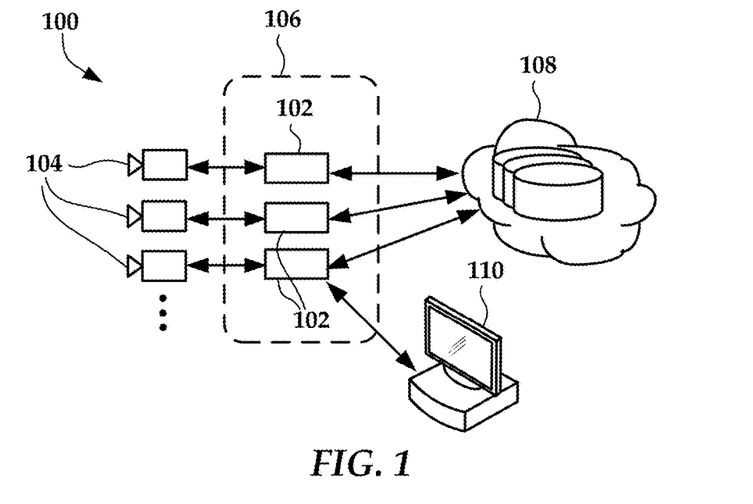
FIG. 1 is a block diagram of an edge storage system according to an example embodiment.

An alternative to analyzing dynamically generated sensor data in the cloud is using distributed edge storage, where a large portion of data F is divided into partitions and each partition is stored in an available edge device close to the data source. In FIG. 1, a block diagram shows an edge storage system 100 according to an example embodiment. A plurality of storage nodes 102 store data from sensors 104 (e.g., cameras) or some other data generator. Collectively, at least the storage nodes 102 form an edge layer 106 that are physically close to the sensors 104 and may also send some or all of the data to cloud storage 108. Note that the sensors 104 may also be considered part of the edge layer 106, and in some cases some or all of the sensors 104 may be integrated together with the storage nodes 102, e.g., within the same device.

Distributed edge storage provides data availability closer to where it is needed and reduces delay. For example, a user terminal 110 in proximity to the edge layer 106 may actively monitor the sensors 104 and/or storage nodes 102 looking for patterns and/or events that occur in near real-time. The devices of the edge layer 106 may also send some of the data to the cloud storage, e.g., for archival purposes, and the terminal 110 may also access data there in situations that are not sensitive to time delays.

Storing data on edge devices can create a more responsive system, however may also risk data security. For example, the edge devices may have limited capabilities (e.g., computation, memory) and therefore may not be able to implement multiple layers of security without unduly limiting performance. The edge devices may also not be under the control of a single entity, which can make enforcing security policies difficult. This disclosure describes a security scheme that addresses security challenges that are specific to edge devices, but that may be applicable to other storage systems, e.g., centralized or decentralized distributed storage systems.

For distributed edge storage setup, one appropriate attack model is the case where a number of edge devices are compromised. More specifically, an eavesdropping attack is a scenario in which the attacker (eavesdropper) controls a group of edge devices and spies on the data stored in them. The goal is to keep data confidential from the devices under attack used as distributed storage nodes. An eavesdropping attack scenario according to an example embodiment is shown in the block diagram of FIG. 2.

Figure 2:
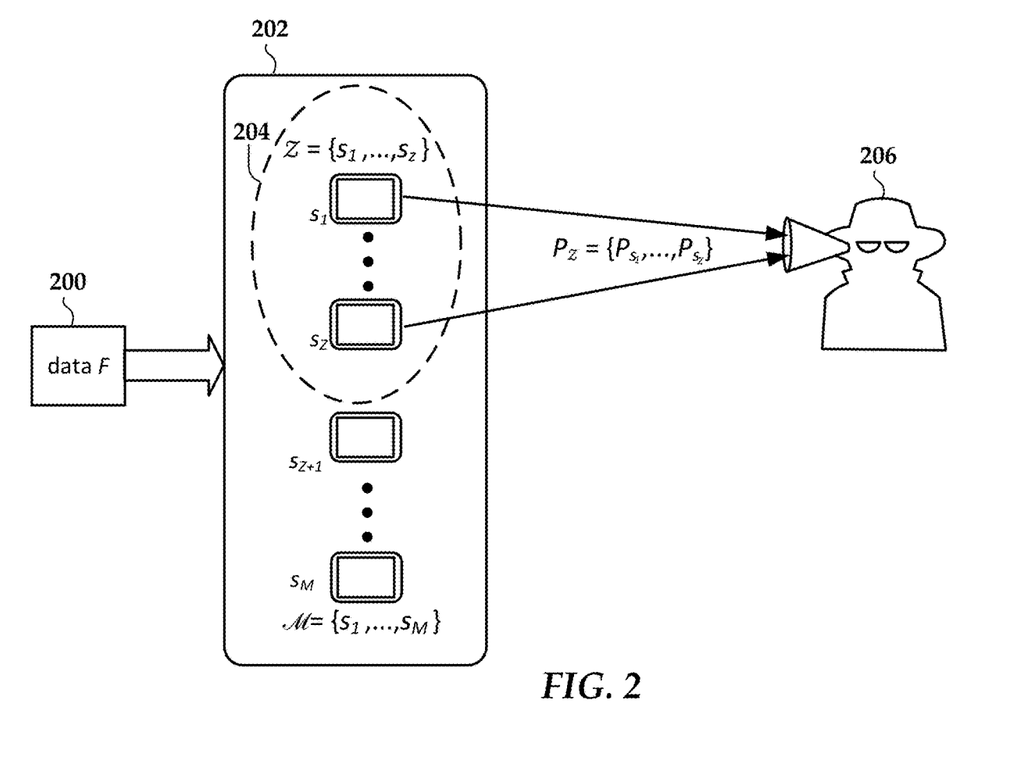
FIG. 2 is a block diagram of showing an eavesdropping scenario according to an example embodiment.

Data 200 (e.g., a file F) is stored in a distributed manner among a group of edge storage nodes 202, which may be accessible via a network. An end user may desire to store the file F via a network connected computer device, such as user terminal 110 shown in FIG. 1. For purposes of this disclosure, a storage node is an independently operable, self-contained computing unit that includes at least some available storage. This independence means that an attacker 206 that has access to one storage node does not necessarily have access to other nodes that interoperate to store parts of the data 200. This is different than other distributed storage schemes such as a disk array where data file portions may be distributed among different disks. Generally, an attacker that can access one disk in array (e.g., by having access to the host computer or a storage controller card) can usually access all of the disks. Also note that the edge storage nodes 202 do not necessarily need to communicate with each other to achieve the distributed storage described herein, but all may be accessible by a single entity, e.g., an authorized user terminal.

In this example, a subset 204 of the edge storage nodes 202 can be accessed by the attacker 206 such that the attacker 206 can at least view the data of interest stored on the subset 204. For purposes of this disclosure, the value Z signifies the maximum number of nodes to which the attacker 206 has access. The system is designed such that the attacker 206 cannot read any partial information about the data file 200 with access to only Z nodes. An authorized user will have access to more than Z of the nodes and therefore can read the data file 200. In some embodiment, the authorized user will need access to all of the edge nodes 202 to read the data file 200, and in other embodiments the authorized user may be able to read the data file 200 with fewer than all of the nodes 202, but more than Z nodes.

Secret sharing schemes using linear coded keys, addresses eavesdropping attacks, where data is divided into shares with equal sizes and each share is masked with linear coded keys and stored in one of the available storage nodes. For instance, assume there are M=4 available storage nodes of $\mathcal{M} = \{s_1, s_2, s_3, s_4\}$. The file F is first divided into two equal shares of $f_1$ and $f_2$, and keys $k_1$ and $k_2$ are generated. Then, the four packets of $P_{s_1} = k_1$, $P_{s_2} = k_2$, $P_{s_3} = f_1 + k_2$, and $P_{s_3} = f_1 + k_1 + 2k_2$ are created and stored in the four storage nodes of $s_1$, $s_2$, $s_3$, and $s_4$. Note that the values of the packets are arithmetically combined as indicated and truncated to fit in the packets. This system setup keeps both shares $f_1$ and $f_2$ confidential from any Z=2 storage nodes that might be under an eavesdropping attack.

Figure 3:
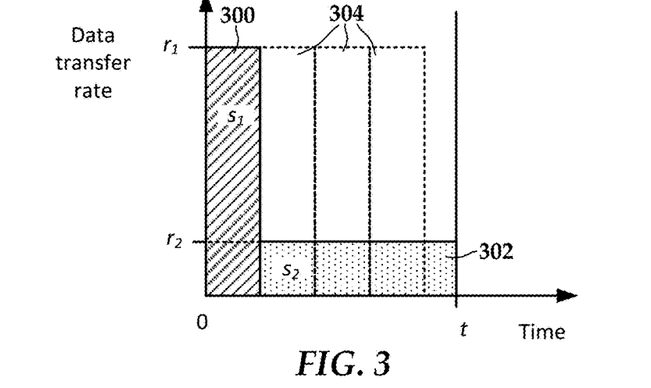
FIG. 3 is a block diagram showing node storage availability according to example embodiments.

The edge devices 202 are heterogeneous with different memory, compute, bandwidth, power, etc. Direct application of the existing secret sharing schemes may yield poor performance for distributed edge storage as they do not take into account the heterogeneity of storage nodes. For example, if the four storage nodes $s_1$, $s_2$, $s_3$, and $s_4$ have different allocated storage availability, then the stored packets of $s_1$, $s_2$, $s_3$, and $s_4$ should have different sizes. For purposes of this disclosure, the term "storage availability" is used to describe the capability of a storage node to fulfill a request that meets some minimum requirement. The storage node should not only have the available capacity to store the data but should have performance when writing to and reading from the storage (which includes network communications) that satisfies a minimum standard defined for the system. In FIG. 3, a diagram shows how storage availability may be different for different storage nodes according to an example embodiment.

In FIG. 3, rectangles 300 and 302 represent data transfer over time for two different heterogeneous storage nodes $s_1$ and $s_2$. Node $s_1$ has a higher transfer rate $r_1$ than node $s_2$, which transfers data at rate $r_2$. A partition of size |f| is available if the data storage node can transmit and receive the partition within time t. The area of blocks 300 and 302 are both of size |f|, thus both of these nodes have storage availability of at least one partition. As indicated by blocks 304, the node $s_1$ can theoretically have storage availability of four partitions of size |f|, assuming the node $s_1$ also has enough storage capacity available. In this example, even if node $s_2$ had a much higher storage capacity than node $s_1$, it would still have ¼ the storage availability.

Figure 4:
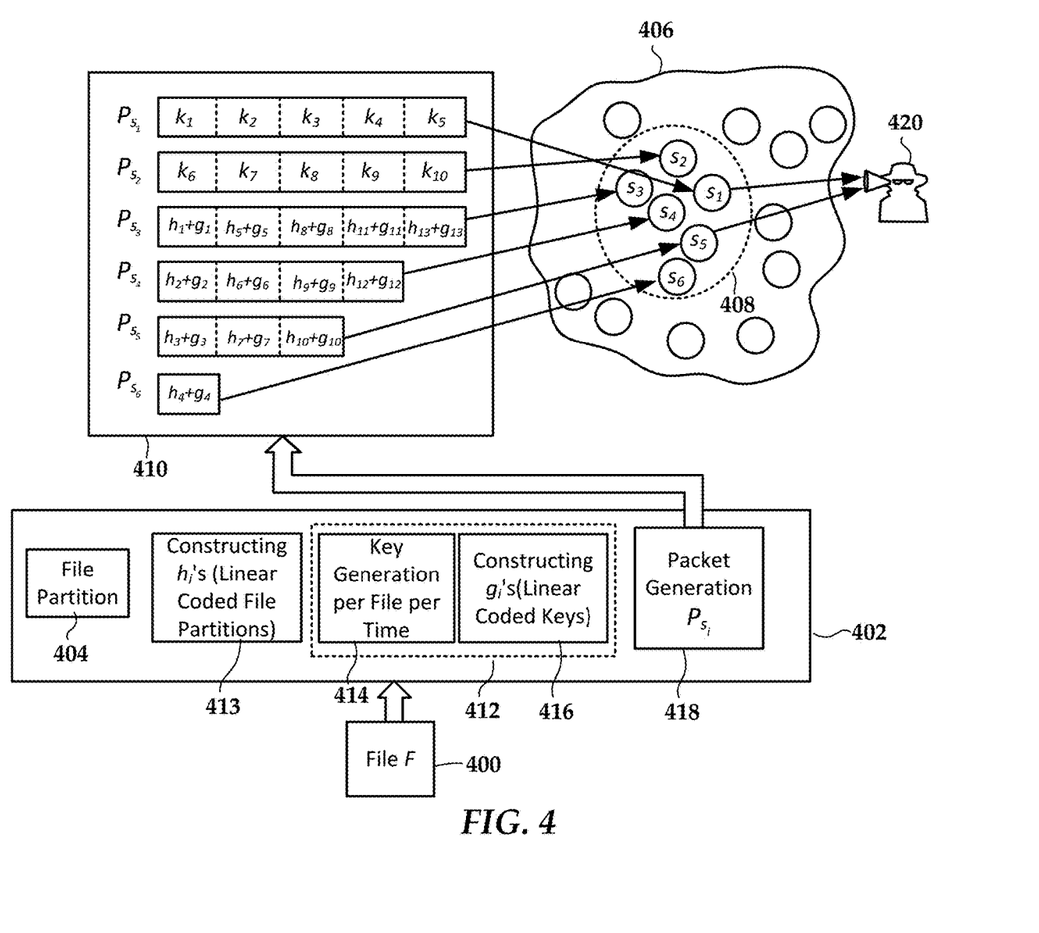
FIG. 4 is a block diagram showing a distributed edge storage scheme according to an example embodiment.

This disclosure covers, among other things (i) how to select storage nodes among all candidate storage nodes, (ii) how to partition file F, (iii) how to generate the keys, and (iv) how to create packets to be stored in the selected storage nodes. In FIG. 4, a block diagram shows a distributed edge storage scheme according to an example embodiment. A file 400 is processed by a storage processing unit 402, which may include conventional computing hardware such as processors, memory, input/output busses, etc., as well as specialized hardware, e.g., application-specific integrated circuits, digital signal processors etc. The storage processing unit includes functional units (e.g., software modules, logic circuits) such as a file partitioner 404 that may be configured to query an edge network 406 of edge storage nodes to determine storage availability of the individual storage nodes. Using techniques that will be discussed below, the partitioner selects a subset 408 of the nodes and creates a definition 410 of the storage configuration for the file 400. This definition 410 includes identification of the selected storage nodes, the partition/packet size on each node, the arrangement of data and keys in each partition, etc.

Based on the definition of the partitions from file partitioner 404, a processing module 413 generates linear coded partitions, which are referred to as $h_i$'s. A key management section 412 includes a key generation module 414 that generates a key set for the file 400 and a combination module 416 linearly combines the keys of the set into linear coded keys, $g_i$'s. A packet generation module 418 uses the definition 410 and the linear coded keys to generate and store the file 400 on the network 406. A similar set of modules may be used to read data from the network 406, based on the definition 410, download the partitions/packets, unencrypt the partitions/packets, and reassemble the file.

In this system model, there are M heterogeneous edge devices 406 that can be used as distributed storage nodes. The set of all candidate storage nodes is denoted by $\mathcal{M} = \{s_1, s_2, \ldots, s_M\}$. First, a subset 408 of all M available storage nodes are selected to be used for storing data F, securely. The subset 408 of selected storage nodes is denoted by $\mathcal{N} = \{s_1, s_2, \ldots, s_N\}$, where N≤M. Then, the set of packets 410 $\mathcal{P}_\mathcal{N} = \{P_{s_i}, s_i \in \mathcal{N}\}$ are created to be stored in the set of the selected storage nodes, where $P_{s_i}$ is stored at storage node $s_i \in \mathcal{N}$.

It is assumed that the system is vulnerable to an attack, where the capability of the attacker is characterized in terms of parameter Z<N. More specifically, the attacker 420 can access the data stored in at most Z storage nodes (e.g., two nodes $s_1$ and $s_5$ as shown in the example of FIG. 4). However, the information on which storage nodes are under attack, is not known at the defender side, therefore, data should be made confidential from any Z storage nodes. The value of Z can also be considered as a security parameter (e.g., defined by the system designer) wherein higher values of Z provides more security to the system and smaller values of Z makes the system more vulnerable to an attack. From the defender point of view, a more robust system with larger values of Z comes with the cost of an increase in the memory usage (increase in the number of distributed storage nodes) and an increase in the complexity of designing the secure system. In other words, parameter Z can be considered a tradeoff between providing more security and the increase in the complexity of system by considering the vulnerability state of the system to an attack.

The data in the file 400 is stored such that the attacker 420 cannot get any meaningful information about data. More specifically, the proposed solution provides information theoretic secrecy defined as $H(F|\mathcal{P}_Z)=H(F)$, where $H(.)$ is the information theory entropy and $\mathcal{P}_Z$ is the data stored in any storage set $Z \subset \mathcal{N}$, such that $|Z|=Z$. One of the applications of information theoretic secrecy is where a linear combination of the data partitions can reveal some meaningful information about the whole data. In the proposed method, one goal is to keep any linear combination of the data partitions confidential from any subset of storage nodes with size Z.

Another goal in designing the distributed storage system is to add redundancy such that data F can be retrieved by having access to the data stored in t devices, where $Z<t\leq N$. The reason behind this consideration is that the edge devices are mobile and the encounter time of the authorized user with the storage nodes may vary over time, e.g., the storage nodes may be offline from time to time. In addition, edge devices are not designed for enterprise purposes and thus their tolerance threshold against failure might be low. Therefore, the goal is providing the ability to retrieve data by having access to less than all N storage nodes in case some storage nodes become unavailable due to mobility or failure.

Figure 5:
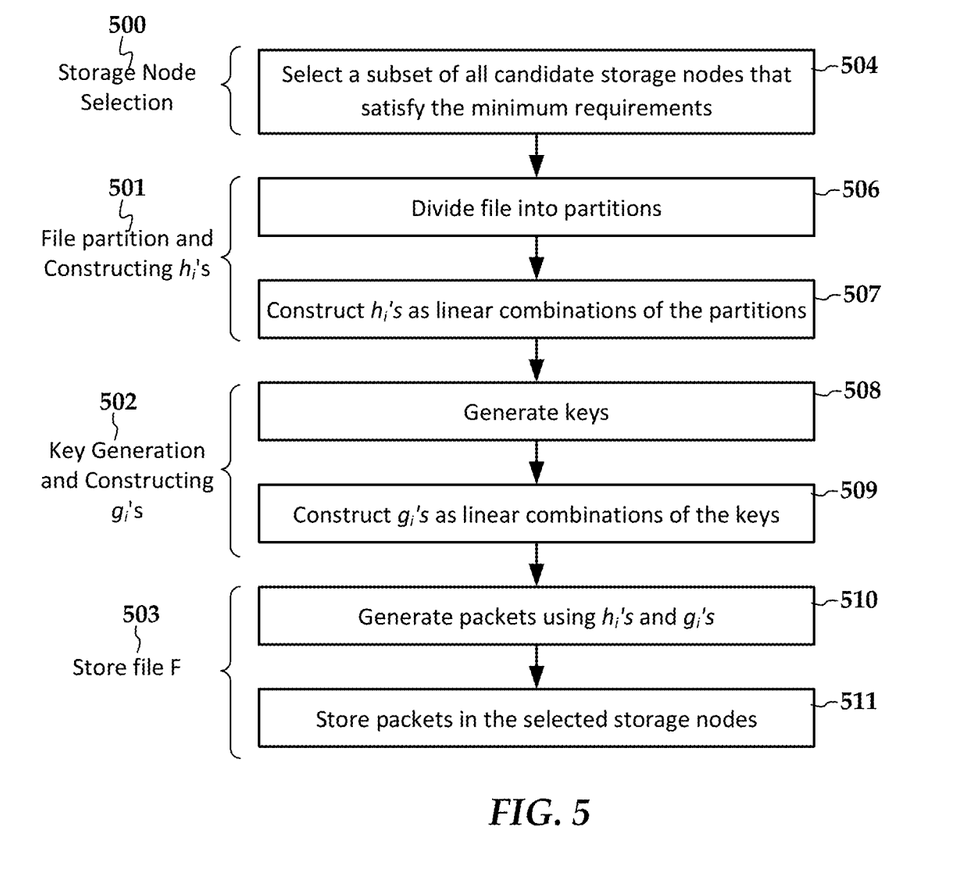
FIG. 5 is a flowchart showing configuration of a distributed edge storage system according to an example embodiment.

As shown in the flowchart of FIG. 5, design of a system according to an example embodiment includes the following stages: storage node selection 500, file partition and constructing $h_i$'s 501, key generation and constructing $g_i$'s 502, and packet generation 503. In the first stage 500, a subset of all candidate storage nodes is selected 504 to store file F distributedly. The selected storage node set should satisfy the minimum requirements to provide security and resiliency to the system. In the second stage 501, the file F is divided 506 into partitions and $h_i$'s are constructed 507 as the linear combinations of the file partitions, where $h_i$'s are used to add redundancy. In the third stage 502, keys are generated 508 and $g_i$'s are constructed 509 as the linear combinations of the generated keys, where $g_i$'s are used to mask the file partitions. In the fourth stage 503, the constructed $h_i$'s and $g_i$'s are used to generate 510 packets and store them 511 in the set of selected storage nodes. The details of each stage along with a complementary example are described below.

Storage Selection

In order to use the available resources efficiently, the minimum required resources for creating and storing keys are determined such that the privacy conditions are met. All the remaining available resources are utilized to add redundancy such that the designed system can be more robust to edge-failure/loss. The minimum requirement to satisfy the information theory privacy for storing a file partition f in a storage node is to mask it with a random key that has the same size as f, e.g., f+k, where $|k|=|f|$. In addition, to keep data confidential from any Z storage nodes, the packets stored in any Z storage nodes should be linearly independent.

For this linear independence constraint to be satisfied, one requirement is that for any stored packet $P_{s_i}$ (stored in storage node $s_i$) with size $|P_{s_i}|$, there should be at least Z other stored packets (each stored in another storage node) with size greater than or equal to $|P_{s_i}|$. In other words, if the storage nodes are ordered in the order of descending allocated storage sizes, $|s_1|\geq|s_2|\geq \ldots |s_N|$, the packets stored in the first Z+1 storage nodes should have the same size. In addition, any Z storage nodes should contain linearly independent packets. Therefore, the maximum size of data F that can be stored distributedly among the N storage nodes is $\sum_{i=Z+1}^{N}|s_i|$. Note that determining the allocated storage size for each storage node can take a number of design parameters into account. Here, it is assumed that $|s_i|$ is the allocated size of storage $s_i$ that is optimized for a given system cost (bandwidth, $/TB, power, etc.).

In order to add redundancy to the system, more storage will be allocated, e.g., by adding more storage nodes. Thus, for selecting storage nodes the requirement of $\sum_{i=Z+1}^{N}|s_i|>|F|+|F_{red}|$ should be satisfied, where $|F_{red}|$ is the estimated desired redundancy. For example, $|F_{red}|$ can be set as $|F|$. As explained next, the storage system improves this estimation by taking into account the system parameter t, the number of storage nodes that an authorized user should have access to in order to retrieve data F. Therefore, in the first step, the N storage nodes are selected such that $\sum_{i=Z+1}^{N}|s_i|>2.5|F|$ is satisfied. In the next step, the size of each packet to be stored in each storage node $s_i$ and subsequently the value of parameter t that can be achieved with this set of storage nodes are determined.

In order to provide privacy, the size of key required to mask file F is restricted by the maximum packet size stored over all N storage nodes. To minimize the size of key and thus providing opportunity to add more redundancy to the system, it is desired to use the full capacity of storage nodes with smaller storage sizes other than using all available memory in storage nodes with larger storage sizes. On the other hand, in order to decrease the complexity, it is desired to partition data F into larger parts, so that the number of file partitions is smaller. For this purpose, the storage system uses the maximum storage size from the allocated size of $s_N$ for storing packet $P_{s_N}$ such that $s_N$ can contain one partition of file F, e.g., $|P_{s_N}|$ is equal to the maximum factor of $|F|$, subject to $|P_{s_N}|\leq|s_N|$. Thus, F can be divided into $d=|F|/|P_{s_N}|$ partitions, each with size $|P_{s_N}|$.

For the last N−Z storage nodes, each $P_{s_i}$, $Z<i\leq N$ is selected such that its size is a multiple of the size of $|P_{s_N}|$, e.g., $|P_{s_i}|=n_i|P_{s_N}|$, $Z<i\leq N$, where $n_i$ is the largest integer for which $|P_{s_i}|\leq|s_i|$. For the first Z storage nodes, $P_{s_i}$ is selected such that $|P_{s_i}|=n_{Z+1}|P_{s_N}|$, $i\leq Z$, as it can be proved that allocating more memory than $n_{Z+1}|P_{s_N}|$ is not beneficial and thus $n_i=n_{Z+1}$, $1\leq i\leq Z+1$. With this system setup, it can be proved that the amount of information that can be stored securely over all N storage nodes is shown in Equation (1), where, $N_j$ is the number of storage nodes with packets containing j multiples of $|P_{s_N}|$, i.e., $N_j=|\mathcal{N}_j|$, where $\mathcal{N}_j=\{s_i||P_{s_i}|=j|P_{s_N}|\}$ and $|F_{red}|$ is the redundancy.

$$|F|+|F_{red}| = |P_{s_N}|\begin{pmatrix} N-Z+\max(0, N-N_1-Z)+ \\ \max(0, N-N_1-N_2-Z)+\ldots \end{pmatrix} \quad (1)$$

$$= |P_{s_N}| \left( N - Z + \sum_{i=1}^{n_{Z+1}} \max\left(0, \left(N - Z - \sum_{j=1}^{i} N_j\right)\right) \right)$$

The amount of information that can be obtained by having access to t selected storage nodes among all N storage nodes is shown in Equation (2), where, $t_j$ is the number of storage nodes that are selected from the set $\mathcal{N}_j$ among all selected t storage nodes. Note that in Equation (2), $n_1 = n_{Z+1}$.

$$\text{info} = |P_{s_N}|(t - Z + \Sigma_{i=1}^{n_1} \max(0, (t - Z - \Sigma_{j=1}^{i} t_j))) \quad (2)$$

The probability that file F can be retrieved by having access to t random storage nodes among all N storage nodes is equal to the probability that the amount of information obtained from any t random storage nodes is greater than or equal to |F|. It can be proved that this probability is calculated using Equation (3) below, where $d = |F|/|P_{s_N}|$ is the number of file partitions. If pr(info ≥|F|) is less than an acceptable threshold, then either parameter t should be increased or the set $\mathcal{N}$ should be changed. The threshold probability can be determined based on the probability that a node fails or moves away. One change in the set $\mathcal{N}$ that might increase pr(info ≥|F|) is replacing nodes having smaller storage sizes with storage nodes having larger storage sizes. After modifying parameter t or the set $\mathcal{N}$, pr(info ≥|F|) should be recalculated and further changes should be made if required until pr(info ≥|F|) meets the acceptable threshold.

if $t \geq d + Z$:  (3)

Figure 6:
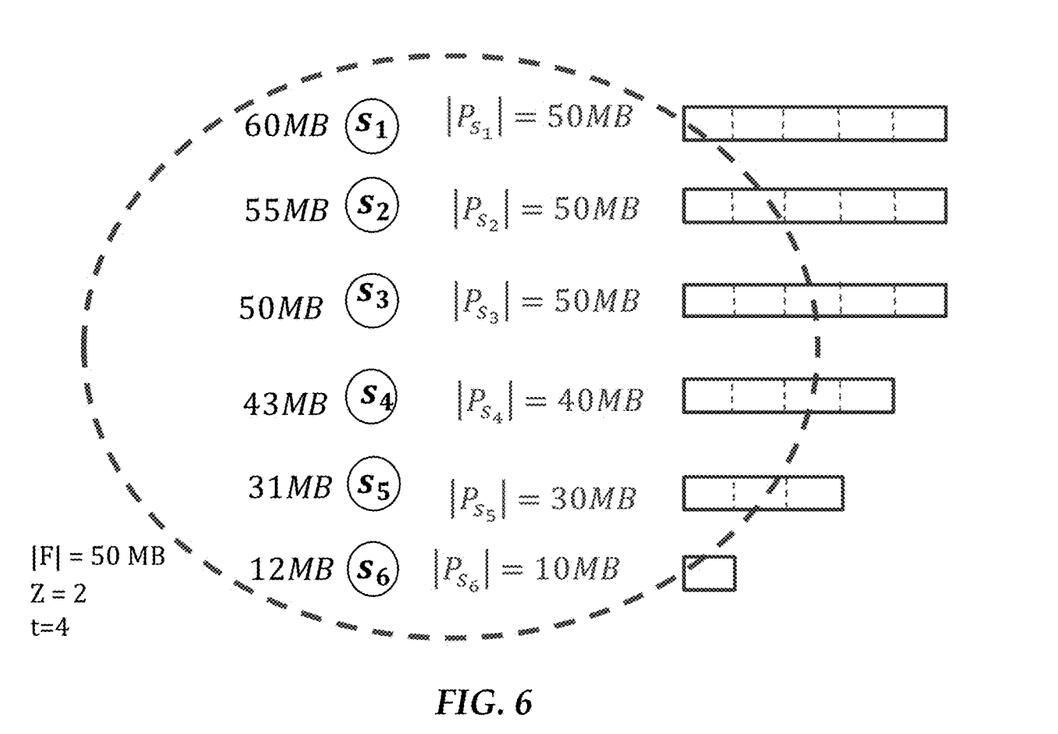
FIG. 6 is a block diagram showing selection of storage nodes according to an example embodiment.

$pr(\text{info} \geq |F|) = 1$ else if $Z < t < d + Z$:

$$pr(\text{info} \geq |F|) = 1 - \sum_{t_1 = t'_1}^{N_1} \sum_{t_2 = t'_2}^{\min(t - t_1, N_2)} \cdots$$

$$\sum_{t_{n_1-1} = t'_{n_1-1}}^{\min(t - \sum_{j=1}^{n_1-1} t_j, N_{n_1})} \frac{\binom{N_1}{t_1}\binom{N_2}{t_2} \cdots \binom{N_{n_1-1}}{t_{n_1-1}} \binom{N_{n_1}}{t - \sum_{i=1}^{n_1-1} t_i}}{\binom{N}{t}}$$

where:

$t'_1 = \max(2t - 2Z - d + 1, 0)$, $t'_2 = \max(3t - 3Z - 2t_1 - d + 1, 0)$, and $t'_{n_1-1} =$
$\max(n_1 t - n_1 Z - (n_1 - 1)t_1 - (n_1 - 2)t_2 - \ldots - 2t_{n_1-2} - d + 1, 0)$ else if $t \leq Z$: $pr(\text{info} \geq |F|) = 0$ In FIGS. 6-14, diagrams show the allocation of space in a distributed storage network according to an example embodiment. As seen in FIG. 6, N=6 available storage nodes of $\{s_1, s_2, s_3, s_4, s_5, s_6\}$ are selected to store data F distributedly for this example (this also corresponds to the subset of storage nodes 408 shown in FIG. 4). The maximum allocated size in these storage nodes is: $|s_1|=60$ MB, $|s_2|=55$ MB, $|s_3|=50$ MB, $|s_4|=43$ MB, $|s_5|=31$ MB, $|s_6|=12$ MB and the size of file F is |F|=50 MB. Further assume that the privacy parameter Z is equal to Z=2. As seen, the total storage size over all these 6 storage nodes satisfies the initial selection criteria, $\Sigma_{i=3}^{6} s_i > 2.5|F|$.

First, the size of each packet to be stored in each selected storage node is determined. The maximum storage size from the allocated size of $s_N$ for packet $P_{s_N}$ is determined such that $s_N$ can contain one partition of file F. The partition size $|P_{s_N}|$ is determined as the maximum factor of |F|, such that $|P_{s_N}| < |s_N|$. In this case, $|P_{s_N}|$ 10 MB satisfies this condition. The size of packets stored in the last N−Z=4 storage nodes are determined such that each storage node stores as many blocks as possible, where the size of each block is $|P_{s_N}|=10$ MB. $|P_{s_3}|=50$ MB, $|P_{s_4}|=40$ MB, and $|P_{s_5}|=30$ MB, satisfy these conditions. Lastly, the size of packets stored in the first Z=2 storage nodes is determined to be equal to the size of $|P_{s_3}|$, such that $|P_{s_1}|=|P_{s_2}|=50$ MB. This results in the number of blocks at each storage node to be equal to $n_1=5$, $n_2=5$, $n_3=5$, $n_4=4$, $n_5=3$, and $n_6=1$. Also, the number of file partitions for data F is equal to $d=|F|/|P_{s_N}|=5$. Note that this partitioning arrangement corresponds to the block definition 410 shown in FIG. 4.

Next, parameter t is determined, which is the number of nodes that an authorized user should have access to in order to be able to retrieve the whole data F with threshold probability of 60%. In other words, t is the minimum number of storage nodes that an authorize user should have access to the packets stored in them in order to retrieve data F with probability 60%. Using the given formulation in Equation (3), the minimum t for the given threshold of 60% is equal to t=4. Note that the 60% threshold probability is a predefined system requirement, and could be set to other values.

With this threshold probability, the probability that an authorized user can retrieve data F by selecting t random storage nodes out of N storage nodes is greater than or equal to 60%. However, the user can quickly check the number of blocks at each storage and figure out if it can retrieve the data or not. In case it could not retrieve the data, it can select another set of t storage nodes randomly; this increases the probability of success in retrieving the data to 1−(1−0.6)² = 0.84 = 84%, which is significant. Considering the probability of being able to retrieve data F in multiple rounds can also be the criteria for determining the threshold probability for pr(info ≥|F|).

File Partition and Constructing $h_i$'s

The first Z storage nodes are allocated to store the keys only, however the remaining N−Z storage nodes store the file partitions masked with keys. More specifically, each storage $s_i$, $Z < i \leq N$, stores $n_i$ blocks each with size $|P_{s_N}|$, where each block includes two parts, the first part is a function of the file partitions and the second part is a function of keys.

Figure 7:
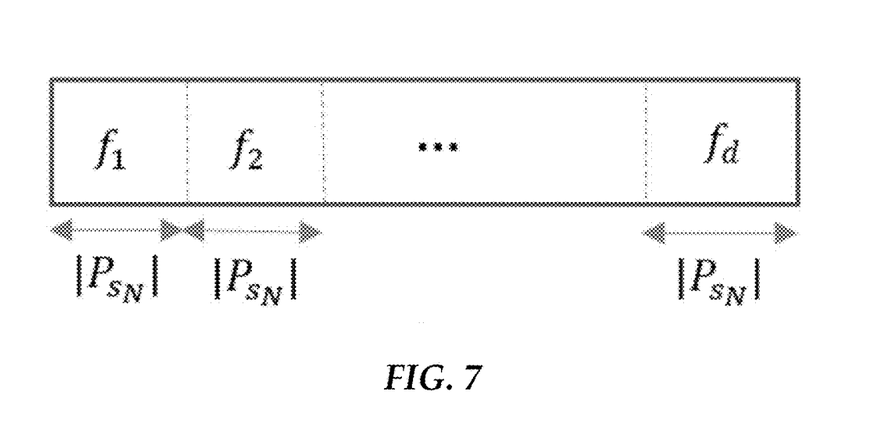
FIG. 7 is a block diagram showing file partitions for distributed storage according to an example embodiment.

The total number of blocks stored in the last N−Z storage nodes is equal to $\Sigma_{i=Z+1}^{N} n_i$. In order to construct the first part of these blocks, first file F is divided into $d=|F|/|P_{s_N}|$ partitions each with size $|P_{s_N}|$, as shown in FIG. 7. Then, $\Sigma N_{i=Z+1}^{N} n_i$ linearly independent combinations of the file partitions are constructed. The set of created combinations are denoted by $\{h_i | 1 \leq i \leq \Sigma_{i=Z+1}^{N} n_i\}$. One way to create linearly independent combinations is defining $h_i$ as $f_i$ for $1 \leq i \leq d$ and using the Vandermonde matrix for constructing the remaining $\Sigma_{i=Z+1}^{N} n_i - d$ linear combinations. The Vandermonde matrix is defined in the Galois field $\mathbb{F}_{q^*}$ with R= $\Sigma_{i=Z+1}^{N} n_i - d$ rows and d columns, as shown in Equation (4) below. The $h_i$, $d+1 \leq i \leq \Sigma_{i=Z+1}^{N} n_i$ are constructed by multiplying the Vandermonde matrix with the column vector of the file partitions as shown in Equations (5) and (6), where $I_{d \times d}$ is a d-dimensional identity matrix.

$$V = \begin{bmatrix} 1 & \alpha_1 & \alpha_1^2 & \cdots & \alpha_1^{d-1} \\ \vdots & & \ddots & & \vdots \\ 1 & \alpha_R & \alpha_R^2 & \cdots & \alpha_R^{d-1} \end{bmatrix} \in \mathbb{F}_{q^*} \quad (4)$$

$$\begin{bmatrix} h_{d+1} \\ h_{d+2} \\ \vdots \\ h_{\Sigma_{i=Z+1}^{N} n_i} \end{bmatrix} = V \begin{bmatrix} f_1 \\ f_2 \\ \vdots \\ f_d \end{bmatrix} = \begin{bmatrix} 1 & \alpha_1 & \alpha_1^2 & \cdots & \alpha_1^{d-1} \\ \vdots & & \ddots & & \vdots \\ 1 & \alpha_R & \alpha_R^2 & \cdots & \alpha_R^{d-1} \end{bmatrix} \begin{bmatrix} f_1 \\ f_2 \\ \vdots \\ f_d \end{bmatrix} \quad (5)$$

$$\begin{bmatrix} h_1 \\ h_2 \\ \vdots \\ h_d \\ h_{d+1} \\ h_{d+2} \\ \vdots \\ h_{\Sigma_{i=Z+1}^{N} n_i} \end{bmatrix} = \begin{bmatrix} I_{d \times d} \\ V \end{bmatrix} \begin{bmatrix} f_1 \\ f_2 \\ \vdots \\ f_d \end{bmatrix} \quad (6)$$

Note that the complexity of constructing $h_i$'s increases with increasing the number of file partitions, d, as the size of matrix and vector to be multiplied to create $h_i$'s, will be larger. Therefore, it is desired to select smaller values for parameter d, which results in dividing file F into smaller number of partitions.

Figure 8:
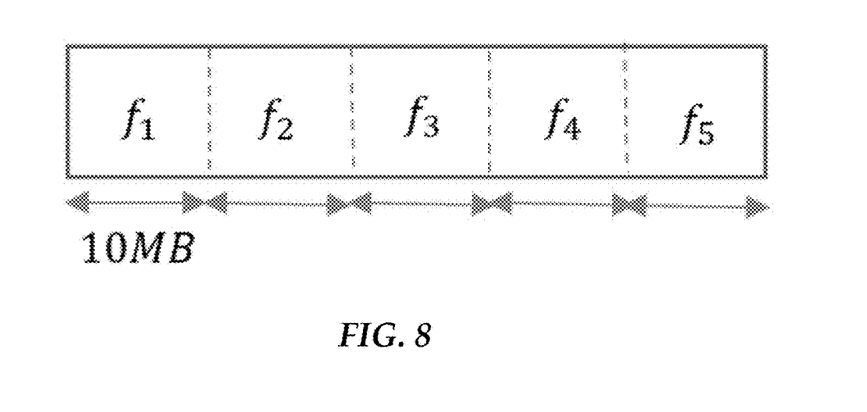
FIG. 8 is a diagram showing file partitions for the arrangement in FIG. 6.
Figure 9:
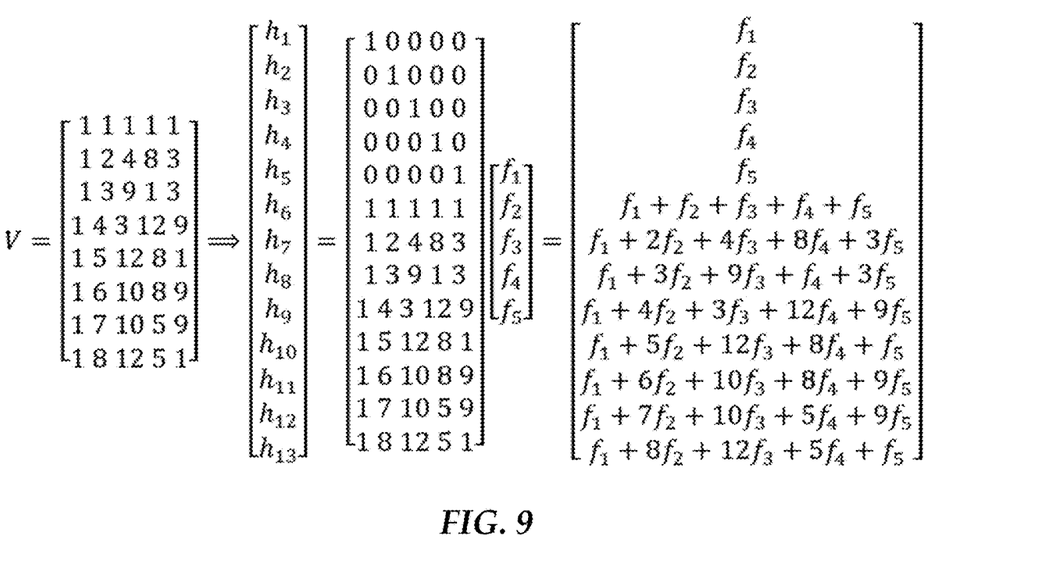
FIG. 9 is a diagram of a matrix used to create independent linear combinations of the file partitions for the arrangement in FIG. 6.

Applying these partitioning concepts to the example arrangement shown in FIG. 6, the packets stored in storage nodes $s_1$ and $s_2$ include keys only (see keys $k_1$ through $k_{10}$ in FIG. 4). The packets stored in storage nodes $s_3$, $s_4$, $s_5$ and $s_6$ include two parts, linear combinations of file partitions, $h_i$'s, and the linear combinations of keys. In order to construct $h_i$'s, file F is divided into d=5 partitions each with size $|P_{s_N}|$=10 MB, as shown in FIG. 8. To create a linear combination of the file partitions, the Vandermonde matrix with $\Sigma_{i=Z+1}^{N} n_i - d = 8$ rows and d=5 columns is formed by selecting q*=13. The formulation in Equation (6) is used to create $h_1, h_2, \ldots, h_{13}$ as shown in FIG. 9.

Key Generation and Constructing $g_i$'s

As mentioned in the previous section, the first Z storage nodes store keys only. Each remaining storage $s_i$, $Z+1 \leq i \leq N$, stores $n_i$ blocks each with size $|P_{s_N}|$, where each block includes two parts. The first part is a function of the file partitions and the second part is a function of keys. Next, the keys stored in the first Z storage nodes are constructed as well as the second parts of packets stored in the remaining N−Z storage nodes.

Figure 10:
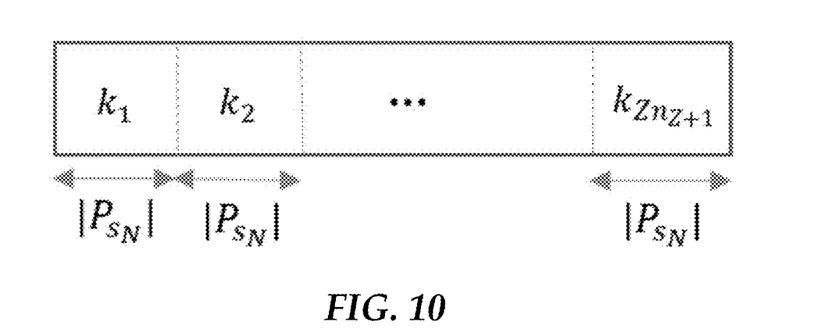
FIG. 10 is a diagram showing key blocks for distributed storage according to an example embodiment.

The minimum required number of key blocks to keep data confidential from any Z storage nodes is restricted by the number of blocks required for the largest stored packet. More specifically, $Zn_{Z+1}$ is the minimum required number of key blocks, where the size of each block is $|P_{s_N}|$. Therefore, first $Zn_{Z+1}$ random key blocks are constructed as shown in FIG. 10, where each block can be represented as a random number in $\mathbb{F}_q$ with $q = 2^{|P_{s_N}|}$.

Each first Z storage node $s_i$, $1 \leq i \leq Z$ stores $n_i = n_{Z+1}$ key blocks. More specifically, as will be explained in section "Packet Generation", the set of key blocks $\{k_j | (i-1)n_1 + 1 \leq j \leq in_1\}$ (where $n_1$ is equal to $n_{Z+1}$) will be stored in storage node $s_i$, $1 \leq i \leq Z$. The second parts of blocks stored in the remaining N−Z storage nodes, denoted by $g_i$'s, are constructed sequentially from the first blocks for all storage nodes to the last blocks for the corresponding storage nodes. The number of blocks for the last N Z storage nodes varies between 1 (for the $N^{th}$ storage) to $n_1$ (for the $Z+1^{st}$ storage).

Note that the $l^{th}$ blocks should be constructed such that any subset of these blocks with size Z is a linearly independent set. For instance, to construct the $l^{th}$ blocks ($1 \leq l \leq n_1$), the Vandermonde matrix with Z columns and as many rows as required can be used. In this way, any subset of Z packets are linearly independent. One other requirement for constructing $g_i$'s is that the probability of retrieving data F by having access to t random edge storage nodes is maximized. To satisfy these two requirements, first, $\{g_1, g_2, \ldots, g_{N-Z}\}$ are constructed to be used in the $1^{st}$ blocks stored in the last N−Z storage nodes. To construct these $g_i$'s, N−Z independent linear combinations of the first blocks of keys stored in the first Z storage nodes are created as defined in Equation (7).

$$\begin{bmatrix} g_1 \\ g_2 \\ \vdots \\ g_{N-Z} \end{bmatrix} = V \begin{bmatrix} k_1 \\ k_{n_1+1} \\ \vdots \\ k_{(Z-1)n_1+1} \end{bmatrix} = \begin{bmatrix} 1 & \alpha_1 & \alpha_1^2 & \cdots & \alpha_1^{Z-1} \\ \vdots & & \ddots & & \vdots \\ 1 & \alpha_{N-Z} & \alpha_{N-Z}^2 & \cdots & \alpha_{N-Z}^{Z-1} \end{bmatrix} \begin{bmatrix} k_1 \\ k_{n_1+1} \\ \vdots \\ k_{(Z-1)n_1+1} \end{bmatrix} \quad (7)$$

The number of storage nodes requiring the $2^{nd}$ block for their stored packet is equal to $N-Z-N_1$, where $N_1$ is the number of storage nodes containing only one block. $\{g_{N-Z+1}, g_{N-Z+2}, \ldots, g_{2(N-Z)-N_1}\}$ is the set of $g_i$'s used in the $2^{nd}$ block of stored packets in the storage nodes $\{s_{Z+1}, s_{Z+2}, \ldots, s_{N-N_1}\}$, which is constructed using the Vandermonde matrix with $N-N_1$ rows and Z columns as shown in Equation (8).

$$\begin{bmatrix} g_{N-Z+1} \\ g_{N-Z+2} \\ \vdots \\ g_{2(N-Z)-N_1} \end{bmatrix} = \quad (8)$$

$$V \begin{bmatrix} k_2 \\ k_{n_1+2} \\ \vdots \\ k_{(Z-1)n_1+2} \end{bmatrix} = \begin{bmatrix} 1 & \alpha_1 & \alpha_1^2 & \cdots & \alpha_1^{Z-1} \\ \vdots & & \ddots & & \vdots \\ 1 & \alpha_{N-Z} & \alpha_{N-Z}^2 & \cdots & \alpha_{N-Z}^{Z-1} \end{bmatrix} \begin{bmatrix} k_2 \\ k_{n_1+2} \\ \vdots \\ k_{(Z-1)n_1+1} \end{bmatrix}$$

Similarly, $\{g_l | N-Z+\Sigma_{m=1}^{i-2}(N-Z-\Sigma_{j=1}^{m} N_j)+1 \leq l \leq N-Z+\Sigma_{m=1}^{i-1}(N-Z-\Sigma_{j=1}^{m} N_j)\}$ are used in the $i^{th}$ blocks of packets stored in the storage nodes $\{s_l | Z+1 \leq l \leq N-\Sigma_{j=1}^{i-1} N_j\}$. These blocks are constructed as shown in Equation (9).

$$\begin{bmatrix} g_{N-Z+\Sigma_{m=1}^{i-2}(N-Z-\Sigma_{j=1}^{m} N_j)+1} \\ g_{N-Z+\Sigma_{m=1}^{i-2}(N-Z-\Sigma_{j=1}^{m} N_j)+2} \\ \vdots \\ g_{N-Z+\Sigma_{m=1}^{i-1}(N-Z-\Sigma_{j=1}^{m} N_j)} \end{bmatrix} = V \begin{bmatrix} k_i \\ k_{n_1+i} \\ \vdots \\ k_{(Z-1)n_1+i} \end{bmatrix} = \quad (9)$$

$$\begin{bmatrix} 1 & \alpha_1 & \alpha_1^2 & \cdots & \alpha_1^{Z-1} \\ \vdots & & \ddots & & \vdots \\ 1 & \alpha_{N-Z-\Sigma_{j=1}^{i-1} N_j} & \alpha_{N-Z-\Sigma_{j=1}^{i-1} N_j}^2 & \cdots & \alpha_{N-Z-\Sigma_{j=1}^{i-1} N_j}^{Z-1} \end{bmatrix}$$

$$\begin{bmatrix} k_2 \\ k_{n_1+2} \\ \vdots \\ k_{(Z-1)n_1+1} \end{bmatrix}$$

Figure 11:
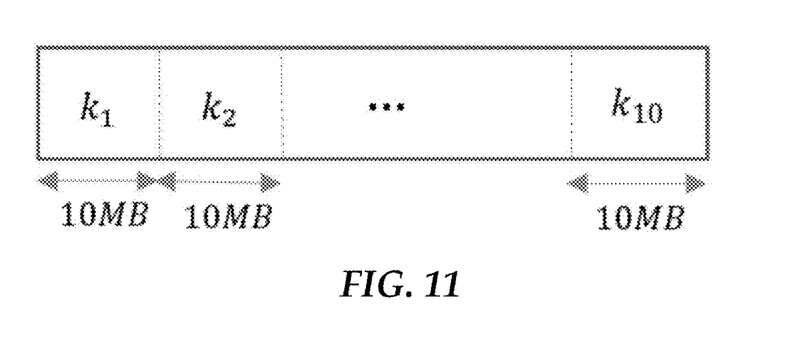
FIG. 11 is a diagram showing key blocks for the arrangement in FIG. 6.

Applying this to the previous example of FIG. 6, the first two storage nodes store keys only, therefore $Zn_{Z+1}=10$ blocks of random keys each with size $|P_{s_N}|=10$ MB are created for the first two storage nodes, as seen in FIG. 11. The first five keys are stored in storage node $s_1$ and the last 5 keys are stored in storage node $s_2$. For the last four storage nodes, $g_i$, $1 \le i \le 13$ are constructed as linear combinations of the created keys, to be used for masking the file partitions stored in these devices. The combinations and storage locations for this example are shown in the block diagram of FIG. 12.

Figure 12:
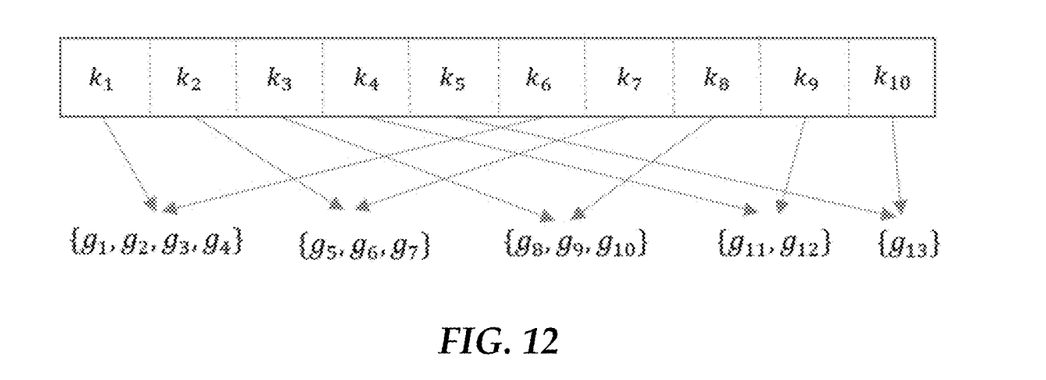
FIGS. 12 and 13 are diagrams showing creation of independent linear combinations of key blocks for the arrangement in FIG. 6.

The key combinations $\{g_1, g_2, g_3, g_4\}$ are used in the first blocks of storage nodes $s_3$, $s_4$, $s_5$, $s_6$ and are constructed as linear combinations of $k_1$, $k_6$ (the keys used in the $1^{st}$ blocks of storage nodes $s_1$, $s_2$). The key combinations $\{g_5, g_6, g_7\}$ are used in the $2^{nd}$ blocks of storage nodes $s_3$, $s_4$, $s_5$ and are constructed as linear combinations of $k_2$, $k_7$ (the keys used in the $2^{nd}$ blocks of storage nodes $s_1$, $s_2$). The key combinations $\{g_8, g_9, g_{10}\}$ are used in the $3^{rd}$ blocks of storage nodes $s_3$, $s_4$, $s_5$ and are constructed as linear combinations of $k_3$, $k_8$ (the keys used in the $3^{rd}$ blocks of storage nodes $s_1$, $s_2$). The key combinations $\{g_{11}, g_{12}\}$ are used in the $4^{th}$ blocks of storage nodes $s_3$, $s_4$ and are constructed as linear combinations of $k_4$, $k_9$ (the keys used in the $4^{th}$ blocks of storage nodes $s_1$, $s_2$). The key combination $\{g_{13}\}$ is used in the $5^{th}$ block of storage node $s_3$ and is constructed as the linear combination of $k_5$, $k_{10}$ (the keys used in the $5^{th}$ blocks of storage nodes $s_1$, $s_2$).

Figure 13:
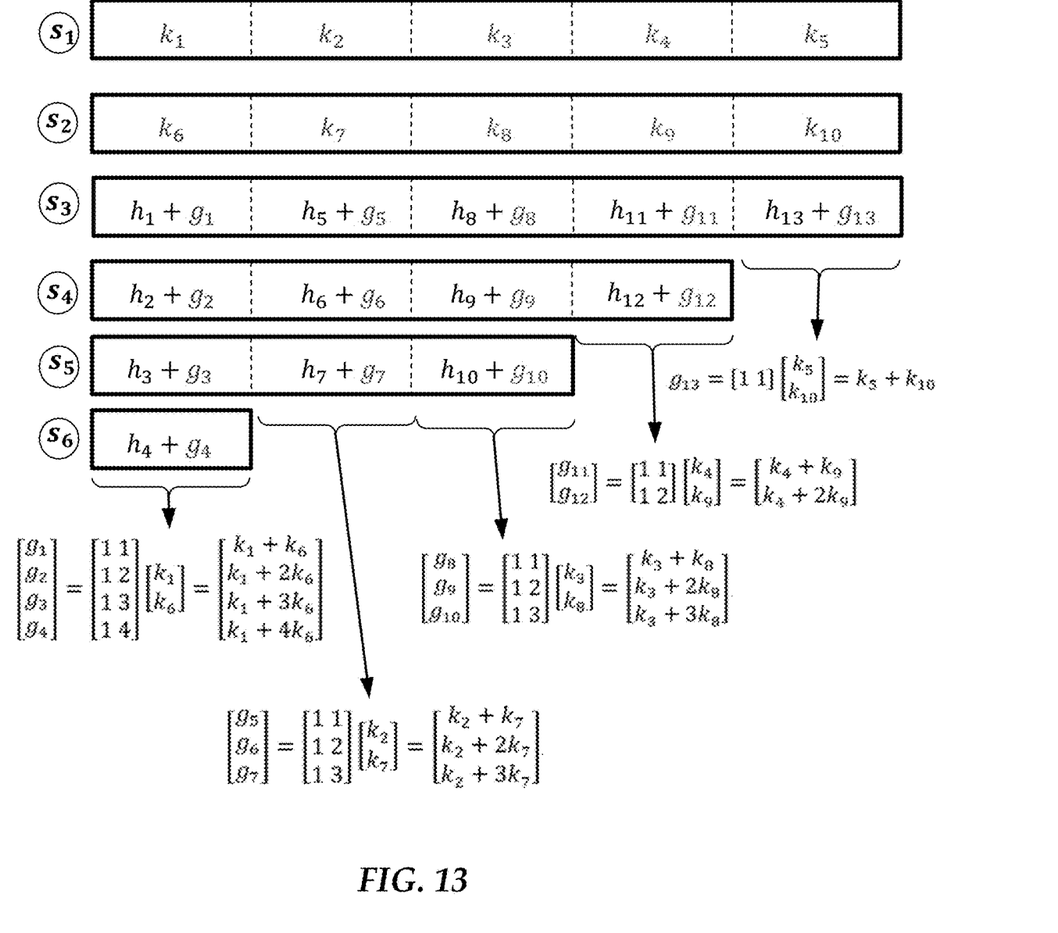

Note that any other selection of keys for constructing $g_i$'s will either result in (i) delivering less info by having access to the data stored in a random selection of t storage nodes, where $Z+1 \le t < N$ or (ii) breaks the privacy conditions required to protect data from any Z storage nodes. The key combinations $g_i$, $1 \le i \le 13$ are constructed using partial of the Vandermonde matrix created for constructing $h_i$'s as shown in FIG. 13.

Packet Generation

Figure 14:
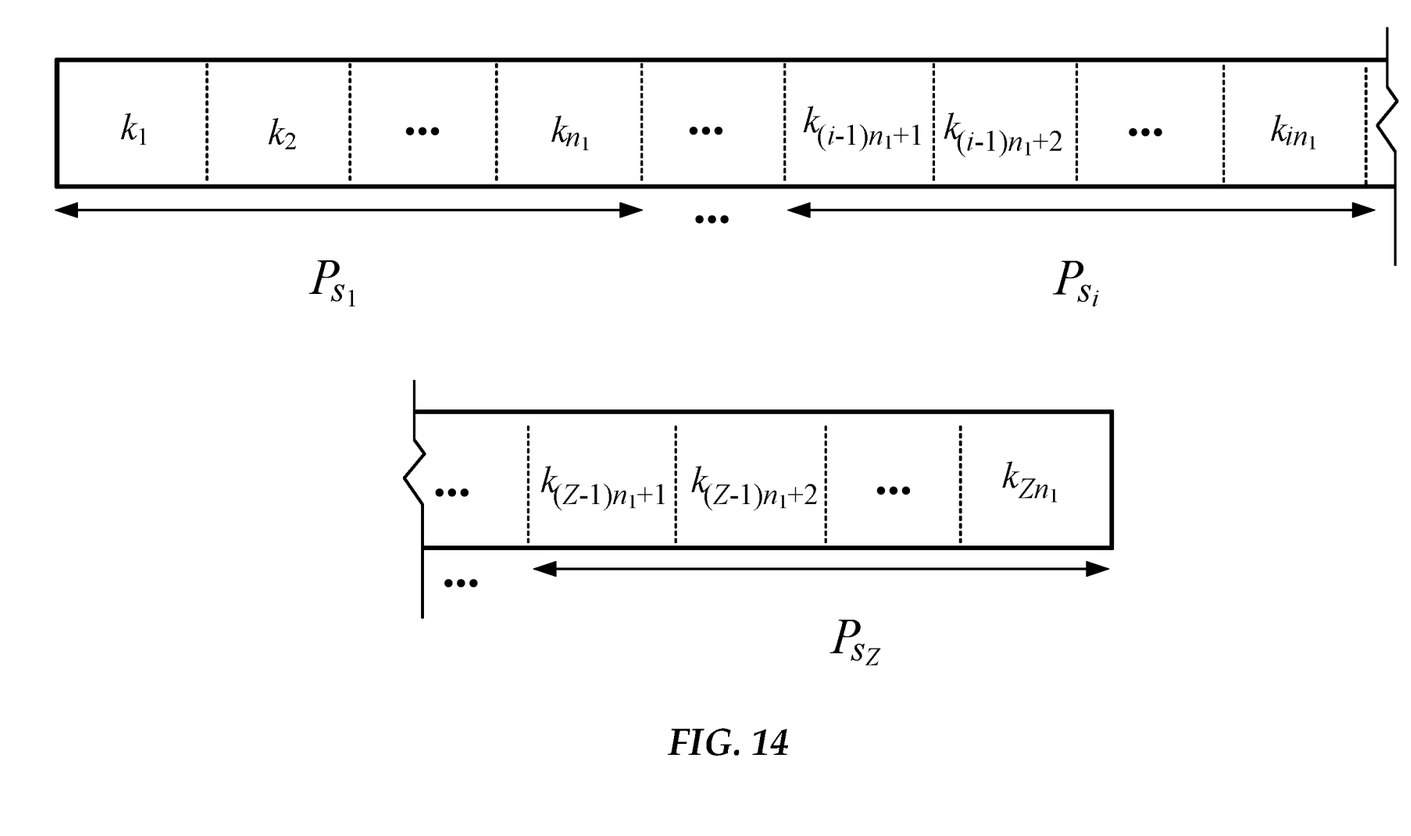
FIG. 14 is a diagram showing packetization of keys according to an example embodiment.

The packet stored in each storage node includes two parts. The first part is a function of the constructed $h_i$'s generated from the file partitions and the second part is a function of the constructed $g_i$'s generated from keys. These parts are combined to generate the packets to be stored in the N storage nodes. The first Z storage nodes are assigned to store keys only. As explained before, the allocated storage sizes for all these storage nodes are the same and equal to $|P_{s_i}|=n_{Z+1}|P_{s_N}|$, $1 \le i \le Z$. Therefore, each storage node can store $n_{Z+1}=n_1$ blocks of key, where the size of each block of key is $|P_{s_N}|$. More specifically, $P_{s_i}=\{k_j|(i-1)n_1+1 \le j \le in_1\}$, as shown in FIG. 14.

The packets stored in the last N–Z storage nodes contain file partitions masked with keys. There are $\Sigma_{i=Z+1}^{N} n_i$ blocks totally in the last N–Z storage nodes and there are $\Sigma_{i=Z+1}^{N} n_1$ generated $h_i$'s in (6) that will play the role of the first part of the packets, file partitions. Note that some of these file partitions are redundant, which are used to make the system resilient to the loss/failure of N–t storage nodes. Each block is masked with the minimum number of keys required to provide privacy, e.g., Z, as unnecessarily adding more keys requires to have access to more blocks to be able to subtract the key part and extract the file part from a packet inquired by an authorized user. In other words, an authorized user should be able to get the maximum info calculated in Equation (2) by having access to any t storage nodes. The details on the design of packets to achieve this objective are provided below.

All $j^{th}$ blocks of the storage nodes requiring at least j blocks are masked with the same set of Z keys. In this way, an authorized user can get the most info by having access to heterogeneous storage nodes. For this purpose, the data stored in the first blocks of $P_{s_i}$, $Z+1 \le i \le N$ are masked with the Z key blocks generated from the first blocks of the key packets, $P_{s_i}$, $1 \le i \le Z$. Similarly, the data stored in the $j^{th}$ blocks of the packets stored in the last N–Z storage nodes are masked with only Z keys generated from the $j^{th}$ blocks of the key packets $P_{s_i}$, $1 \le i \le Z$. In particular, $P_{s_i}$ contains the $n_i$ blocks shown in Expression (10), where $h_l$ and $g_l$ are calculated in Equations (6) and (9). Note that the addition of $h_l$ and $g_l$ is in field $\mathbb{F}_q$, where $q=2^{|P_{s_N}|}$ with $|P_{s_N}|$ be equal to the size of the file partitions $f_i$ in bits.

$$\{h_l + g_l | N - Z + \sum_{m=1}^{i-2}\left(N - Z - \sum_{j=1}^{m} N_j\right) + 1 \le \qquad (10)$$

$$l \le N - Z + \sum_{m=1}^{i-1}\left(N - Z - \sum_{j=1}^{m} N_j\right)\}$$

Returning to the previous example, the packets stored in the first two storage nodes $s_1$, $s_2$ store keys only (see FIG. 4). The packets stored in the storage nodes $s_3$, $s_4$, $s_5$, $s_6$ include two parts, $h_i$'s, linear combinations of the file partitions, and $g_i$'s, linear combinations of keys. These packets are generated sequentially block by block for all storage nodes. The $1^{st}$ blocks of all packets are generated by adding the first 4 generated $h_i$'s (i.e., $h_1$, $h_2$, $h_3$, $h_4$) and the first 4 generated $g_i$'s (i.e., $g_1$, $g_2$, $g_3$, $g_4$). The 2nd blocks of packets are generated by adding $h_5$, $h_6$, $h_7$ and $g_5$, $g_6$, $g_7$. Subsequently, the $3^{rd}$ blocks, the $4^{th}$ blocks and the $5^{th}$ block are generated by adding $h_8$, $h_9$, $h_{10}$ and $g_8$, $g_9$, $g_{10}$, $h_{11}$, $h_{12}$ and $g_{11}$, $g_{12}$, and $h_{13}$ and $g_{13}$, respectively. Note that the order of using $h_i$'s does not have any impact on the amount of delivered info to an authorized user. However, by using the first generated $h_i$'s for the first blocks, the complexity for extracting the file partitions by the authorized user contacting a random set of t storage nodes becomes smaller.

The methods described above are scalable and adaptive to increasing the size of data F. This is applicable in real-time applications, where the size of data F is constantly increasing over time. These methods are adaptive to adding more storage nodes to the system, which is applicable in dynamic edge environments, where new edge devices may join the network. The methods are also adaptive to increasing the size of a storage node. This is also applicable in dynamic edge environments, where more memory usage in an edge device may become available. The following paragraphs explain how the distributed storage system can be extended to be adaptive and scalable.

More information can be added to the stored file F, once enough amount of data with size equal to the size of one file partition, $|P_{s_N}|$, is collected. The new collected information is first put into one file partition as $f_{d+1}$. Then, the last block of storage node $s_{Z+1}$ is updated by replacing $h_{\Sigma_{i=Z+1}^{N} n_j}$ with $f_{d+1}$. In other words, the packet $P_{s_{Z+1}}$ is updated by replacing its last block with $f_{d+1}g_{\Sigma_{i=Z+1}^{N}n_i}$. In the example shown in FIG. 4, this would involve replacing the last block in $P_{s_3}$ with $f_{d+1}+g_{13}$.

In the next step, the only modification that is required is for $h_l$, $\forall (d+1) \leq l < \Sigma_{i=Z+1}^{N}n_i$ to be added with $\alpha_{l-d}{}^d f_{d+1}$, e.g. $h_l = h_l + \alpha_{l-d}{}^d f_{d+1}$, where $\alpha_{l-d}{}^d$ corresponds to adding one more column to the created Vandermonde matrix in Equation (5) and thus the corresponding blocks using $h_l$, $\forall (d+1) \leq l < \Sigma_{i=Z+1}^{N}n_i$ are updated by adding $\alpha_{l-d}{}^d f_{d+1}$. Note that as d is now updated as d=d+1, the system parameter t, the number of storage nodes that an authorized user should contact to retrieve data F, should be updated using Equation (3).

Note that here the goal is to modify the minimum number of blocks with the minimum required complexity for modifying those blocks. That is why the added file partition is used to replace the last previously generated block. Note that, this strategy does not comply with the strategy to minimize the complexity of extracting data for an authorized user. Therefore, if the priority is to minimize the complexity of extracting data for an authorized user, then Equation (6) could be used to recalculate all elements $h_l$, $\forall 1 \leq l \leq \Sigma_{i=Z+1}^{N}n_i$ by using the updated vector of file partitions and then regenerate all packets using the updated $h_l$'s, which requires higher computational complexity for regenerating packets.

A new storage node can be added to the system by first determining the number of blocks it can store and then creating a new row to the Vandermonde matrix V used in Equations (6) and (9) and constructing as many $h_i$'s and $g_i$'s as the determined number of blocks it can store. Note that the added storage node may increase or decrease the probability of retrieving data F for an authorized user contacting t random storage nodes for a given t. Therefore, the updated pr(info >d) should be calculated using the updated parameters according to Equation (3).

If more memory becomes available in an edge device used as one of the distributed storage nodes, more blocks can be added to the packet stored in that storage node under certain conditions. The condition for adding one more block to the storage node $s_i$ already containing $n_i$ blocks, is that there are at least Z other storage nodes that contain at least $n_i+1$ blocks (or can be modified to contain $n_i+1$ blocks). If this condition is satisfied, the new block is added as the following.

For adding one more block to one of the first Z storage nodes, a new key should be created and stored as the last block in the stored packet. Note that this key will be used to add one more block to one of the other storage nodes containing file partitions. For adding one more block to one of the other storage nodes, i.e., $s_i$, i>Z, a new $h_l$ is constructed by creating a new row of the Vandermonde matrix in (5). Then, a new $g_l$ is constructed by multiplying the corresponding row of the Vandermonde matrix with the key vector containing the keys of the $(n_i+1)^{st}$ blocks of the first Z storage nodes. In the last step, the constructed $h_l$ and $g_l$ are summed and the new block containing $h_l+g_l$ is added as the last block of $P_{s_i}$.

In this document, a framework based on linear coded keys is described. This framework is resilient to the failures or losses of N−t edge devices used as distributed storage nodes and provides information theoretic secrecy for any Z storage nodes, e.g., no adversary having access to the data stored in any z≤Z storage nodes can get any meaningful information about F that is stored distributedly among the N available edge devices. It can be proved that this system is optimal in terms of creating the minimum required number of keys and delivering the maximum information to an authorized user contacting any t>Z storage nodes In FIG. 15, a block diagram illustrates an apparatus 1500 according to an example embodiment. This apparatus 1500 may be configured as a user terminal as described above, although storage nodes may also have similar hardware. The apparatus includes a processor 1502 (e.g., CPU), memory 1504, and input/output circuitry 1506. The memory 1504 may include both volatile memory (e.g., RAM) and non-volatile memory (e.g., flash memory, magnetic storage) and may store instructions 1508, which in this case facilitates distributed storage via a network 1512. The apparatus 1500 has a network interface 1510 that is used for accessing the network 1512. The network 1512 includes a plurality of storage nodes 1514, e.g., edge storage nodes as described above.

Figure 15:
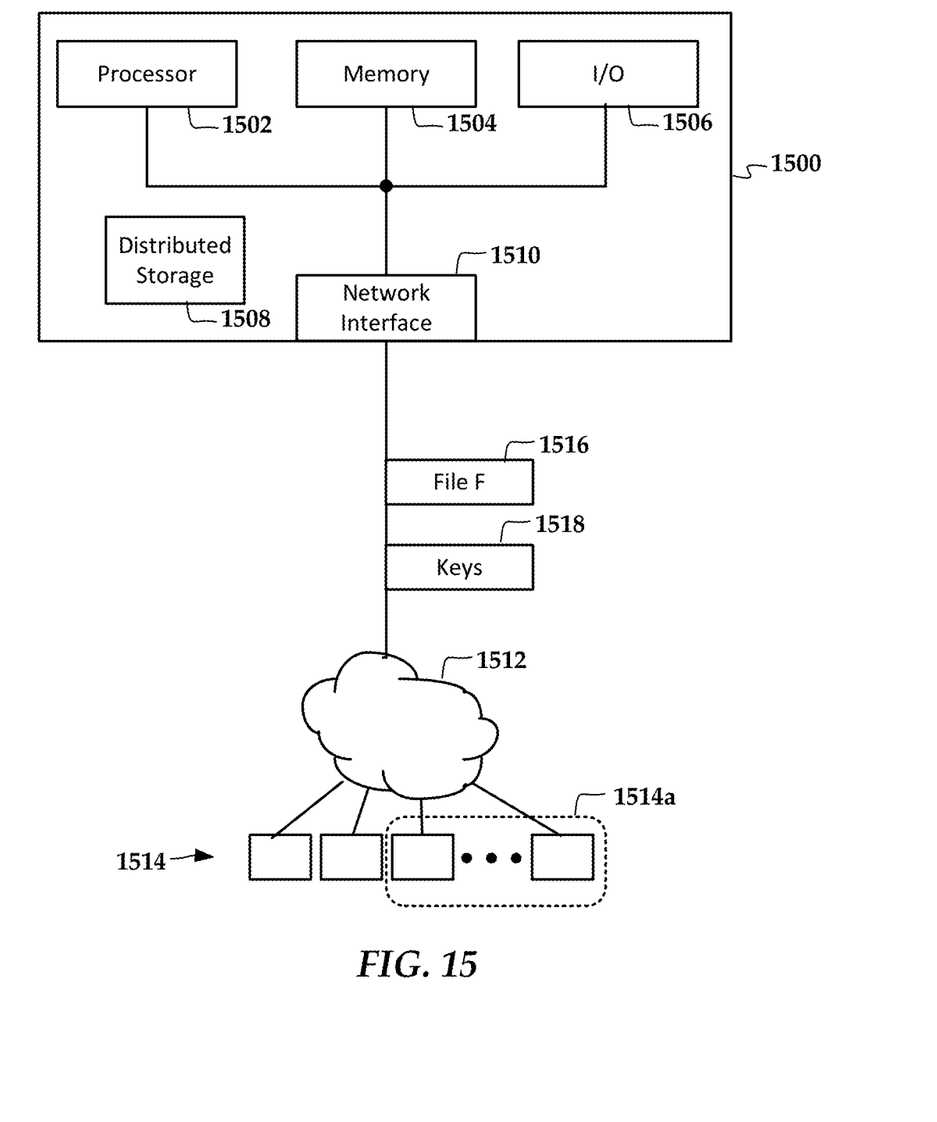
FIG. 15 is a block diagram of an apparatus according to an example embodiment.

The instructions 1508 are operable to cause the processor 1502 to select N storage nodes 1514a that are coupled via the 1512 network to store file 1516 of size |F| and redundancy of size $|F_{red}|$. At least two of the N storage nodes 1514a allocate different sizes of memory for storing the file 1516. The N storage nodes 1514a are ordered from a largest storage capacity at the first storage node to a smallest capacity $|s_N|$ at the $N^{th}$ storage node. The processer 1502 selects a value Z<N, such that an attacker having access to Z storage nodes is unable to decode the file 1516. The file 1516 is divided into d partitions of size $|P_{s_N}|$, e.g., $|P_{s_N}|$ being a maximum factor of |F| subject to $|P_{s_N}| \leq |s_N|$.

The instructions 1508 are operable to cause the processor 1502 to create independent linear combinations $h_i$'s of the d partitions of the file 1516. The processor 1502 generates keys that are stored in the first Z of the N storage nodes 1514a and creates independent linear combinations $g_i$'s of the generated keys. The processor 1502 stores combinations of the $h_i$'s and $g_i$'s in the $(Z+1)^{st}$ to $N^{th}$ storage nodes. The processor 1502 of this or another similar device may be operable to read the file from t of the N storage nodes 1514a, where t<N. The t storage nodes may be randomly selected, and the processor 1502 can determine if the file can be read from the t storage nodes. If not, a second set oft storage nodes can be randomly selected, then the file read from the second set. The sets can be iteratively selected and re-read over more than two rounds until the file is successfully read.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    selecting N storage nodes that are coupled via a network and have a collective available capacity to store a file of size $|F|$ and redundancy of size $|F_{red}|$, wherein at least two of the N storage nodes allocate different sizes of memory for storing the file, the N storage nodes being ordered from a largest storage capacity $|s_1|$ at the first storage node to a smallest capacity $|s_N|$ at the $N^{th}$ storage node;
    selecting a value Z<N, wherein the value of Z is a security parameter selected by a system designer;
    dividing the file into d partitions of size $|P_{s_N}|$, wherein $|P_{s_N}|$ is a maximum factor of $|F|$ subject to $|P_{s_N}| \le |s_N|$;
    creating independent linear combinations $h_i$'s of the d partitions;
    generating keys that are stored in the first Z of the N storage nodes;
    creating independent linear combinations $g_i$'s of the generated keys;
    and
    storing combinations of the $h_i$'s and $g_i$'s in the Z+1 to $N^{th}$ storage nodes.

2. The method of claim 1, wherein the N storage nodes are heterogeneous at least in terms of available storage capacity and sorted based on the available storage capacity such that the first Z storage nodes have the highest storage capacity of the N storage nodes.

3. The method of claim 1, wherein an amount of memory available at each of the storage nodes is based on storage availability of each of the storage nodes, the storage availability being based on both available capacity and data transfer rate.

4. The method of claim 1, wherein creating the independent linear combinations of the keys and the independent linear combinations of the partitions comprises determining coefficients of the independent linear combinations based on rows of a Vandermonde matrix.

5. The method of claim 1, further comprising reading the file from t of the N storage nodes, wherein t<N.

6. The method of claim 5, wherein the t storage nodes are randomly selected, the method further comprising determining if the file can be read from the t storage nodes, and if not, randomly selecting a second set of t storage nodes, and reading the file from the second set.

7. The method of claim 1, wherein the N storage nodes comprise edge nodes.

8. The method of claim 7, wherein the N storage nodes are selected from an edge layer comprising M candidate storage nodes, M>N.

9. The method of claim 1, further comprising:
    determining additional information that is to be added to the file, the size of the additional information $\le |P_{s_N}|$; and
    replacing a last block of the $Z+1^{th}$ storage node with the additional information combined with a selected $g_i$ that was previously used to form the last block of the $Z+1^{th}$ storage node and replacing every other $l^{th}$ block with $h_l = h_l \, \alpha_{l-d}^{\,d} f_{d+1} + g_l$, where $\alpha_{l-d}^{\,d}$ corresponds to adding one more column to the created Vandermonde matrix.

10. The method of claim 1, wherein higher values of Z provide higher levels of security to the file.

11. The method of claim 1, wherein a user having access to more than Z but less than N nodes has a probability of recovering all information of the file that is greater than zero but less than 100%, wherein if the user has access to all of the N nodes, the probability of recovering all information of the file is 100%.

12. A system comprising:
    at least N storage nodes coupled via a network;
    an apparatus coupled to the network and operable to:
        determine that the N storage nodes have a collective available capacity to store a file of size $|F|$ and redundancy of size $|F_{red}|$, wherein at least two of the N storage nodes allocate different sizes of memory for storing the file, the N storage nodes being ordered from a largest storage capacity at the first storage node to a smallest capacity $|s_N|$ at the $N^{th}$ storage node;
        define a value Z<N, wherein the value of Z is a security parameter selected by a system designer;
        divide the file into d partitions of size $|P_{s_N}|$, wherein $|P_{s_N}|$ is a maximum factor of $|F|$ subject to $|P_{s_N}| \le |s_N|$;
        create independent linear combinations $h_i$'s of the d partitions;
        generate keys that are stored in the first Z of the N storage nodes;
        create independent linear combinations s of the generated keys;
    and
        store combinations of the $h_i$'s and $g_i$'s in the Z+1 to $N^{th}$ storage nodes.

13. The system of claim 12, wherein the N storage nodes are heterogeneous at least in terms of available storage capacity and sorted based on the available storage capacity such that the first Z storage nodes have the highest storage capacity of the N storage nodes.

14. The system of claim 12, wherein an amount of memory available at each of the storage nodes is based on storage availability of each of the storage nodes, the storage availability being based on both available capacity and data transfer rate.

15. The system of claim 12, wherein creating the independent linear combinations of generated keys and the independent linear combinations of the file partitions comprises determining coefficients of the independent linear combinations based on rows of a Vandermonde matrix.

16. The system of claim 12, wherein the apparatus is further operable to read the file from t of the N storage nodes, wherein t<N.

17. The system of claim 16, wherein the t storage nodes are randomly selected, the apparatus being further operable to determine if the file can be read from the t storage nodes, and if not, randomly selecting a second set of t storage nodes, and reading the file from the second set.

18. The system of claim 12, wherein the N storage nodes comprise edge nodes, the N storage being selected from an edge layer comprising M candidate storage nodes, M>N.

19. The system of claim 12, wherein the apparatus is further operable to:
    determine additional information that is to be added to the file, the size of the additional information $\le |P_{s_N}|$; and
    replace a last block of the $Z+1^{th}$ storage node with the additional information combined with a selected $g_i$ that was previously used to form the last block of the $Z+1^{th}$ storage node and replacing every other $l^{th}$ block with $h_l = h_l + \alpha_{l-d}^{\,d} f_{d+1} + g_l$, where $\alpha_{l-d}^{\,d}$ corresponds to adding one more column to the created Vandermonde matrix.

20. An apparatus, comprising:
    a network interface operable to communicate with at least N edge storage nodes coupled via a network; and a processor coupled to the network interface and operable to:
- determine that the N edge storage nodes have a collective available capacity to store a file of size $|F|$ and redundancy of size $|F_{red}|$, wherein at least two of the N edge storage nodes allocate different sizes of memory for storing the file, the N edge storage nodes being ordered from a largest storage capacity $|s_1|$ at the first edge storage node to a smallest capacity $|s_N|$ at the $N^{th}$ edge storage node;
- define a value $Z<N$, wherein the value of Z is a security parameter selected by a system designer;
- divide the file into d partitions of size $|P_{s_N}|$, wherein $|P_{s_N}|$ is a maximum factor of $|F|$ subject to $|P_{s_N}| \leq |s_N|$;
- create independent linear combinations $h_i$'s of the d partitions;
- generate random keys that are stored in the first Z of the N edge storage nodes;
- create independent linear combinations s of the random keys;

and
- store combinations of the $h_i$'s and s in the Z+1 to $N^{th}$ edge storage nodes.

* * * * *

UNITED STATES PATENT AND TRADEMARK OFFICE
CERTIFICATE OF CORRECTION

PATENT NO.         : 11,308,041 B2
APPLICATION NO.    : 16/669712
DATED              : April 19, 2022
INVENTOR(S)        : Yasaman Keshtkarjahromi and Mehmet Fatih Erden It is certified that error appears in the above-identified patent and that said Letters Patent is hereby corrected as shown below:

In the Claims

In Claim 6 Line 47, 'oft' should be -- of t --.

In Claim 9 Line 62, '$h_l = h_l \alpha_{l-d} d f_{d+1} + g_l$, where $\alpha_{l-d} d$' -- should be -- $h_l = h_l + \alpha_{l-d}^d f_{d+1} + g_l,$ where $\alpha_{l-d}^d$ --.

In Claim 12 Line 13 'capacity' should be -- capacity $|s_1|$ --.

In Claim 12 Line 24, 's' should be -- $g_i$'s --.

In Claim 17 Line 50, 'oft' should be -- of t --.

In Claim 19 Line 63, '$h_l = h_l + \alpha_{l-d} d f_{d+1} + g_l,$ where $\alpha_{l-d} d$' should be -- $h_l = h_l + \alpha_{l-d}^d f_{d+1} + g_l,$ where $\alpha_{l-d}^d$ --.

In Claim 20 Line 19, 's' should be -- $g_i$'s --.

In Claim 20 Line 22, 's' should be -- $g_i$'s --.

Signed and Sealed this
Eighteenth Day of April, 2023

Katherine Kelly Vidal
*Director of the United States Patent and Trademark Office*